(12) United States Patent
Kelly

(10) Patent No.: US 7,492,986 B1
(45) Date of Patent: Feb. 17, 2009

(54) APPARATUS AND METHOD FOR OPTICAL SWITCHING WITH LIQUID CRYSTALS AND BIREFRINGENT WEDGES

(75) Inventor: Jack R. Kelly, Stow, OH (US)

(73) Assignee: Coadna Photonics, Inc., Sunnyvale, CA (US)

( * ) Notice: Subject to any disclaimer, the term of this patent is extended or adjusted under 35 U.S.C. 154(b) by 0 days.

(21) Appl. No.: 11/737,122

(22) Filed: Apr. 18, 2007

Related U.S. Application Data

(63) Continuation-in-part of application No. 11/318,068, filed on Dec. 23, 2005.

(60) Provisional application No. 60/639,107, filed on Dec. 23, 2004.

(51) Int. Cl.
*G02B 6/42* (2006.01)

(52) U.S. Cl. .............................. 385/16; 385/11; 385/15; 385/17; 385/18; 385/24; 385/31; 359/246; 359/484; 359/487; 359/488; 359/489; 359/490; 359/494; 359/495; 359/497; 398/65; 398/66; 398/81; 349/193; 349/194; 349/201; 349/202

(58) Field of Classification Search .................. 385/1–4, 385/16–17, 31, 40
See application file for complete search history.

(56) References Cited

U.S. PATENT DOCUMENTS

| | | | |
|---|---|---|---|
| 4,103,260 A * | 7/1978 | Buchman .................... | 359/250 |
| 4,720,171 A | 1/1988 | Baker | |
| 4,720,172 A | 1/1988 | Baker | |
| 5,015,057 A | 5/1991 | Rumbaugh et al. | |
| 5,276,747 A * | 1/1994 | Pan ............................. | 385/34 |
| 5,727,109 A * | 3/1998 | Pan et al. .................... | 385/140 |
| 6,111,633 A | 8/2000 | Albert et al. | |
| 6,529,307 B1 * | 3/2003 | Peng et al. .................. | 359/246 |
| 6,765,635 B1 * | 7/2004 | Kelly et al. ................... | 349/76 |
| 6,839,095 B2 * | 1/2005 | Bierhuizen et al. ............. | 349/9 |
| 6,931,165 B2 * | 8/2005 | Nagaeda et al. ............... | 385/11 |
| 7,034,979 B1 * | 4/2006 | Feng et al. .................. | 359/246 |
| 7,251,410 B2 * | 7/2007 | Ide ............................. | 385/140 |
| 7,333,686 B1 * | 2/2008 | Barbarbossa et al. .......... | 385/18 |
| 2001/0048556 A1 * | 12/2001 | Ranalli et al. ............... | 359/497 |
| 2002/0171933 A1 * | 11/2002 | He et al. ..................... | 359/497 |

(Continued)

OTHER PUBLICATIONS

Bruce Winker, Darpa Stab Kickoff Meeting: "Liquid Crystal Agile Beam Steering," Rockwell Science Center, Thousand Oaks, CA, Aug. 8, 2000, 12 pages.

*Primary Examiner*—Brian Healy
*Assistant Examiner*—Hung Lam
(74) *Attorney, Agent, or Firm*—Cooley Godward Kronish LLP

(57) ABSTRACT

An optical switching apparatus includes at least one optical waveguide to deliver at least one input optical beam. A dispersion device spatially separates the at least one input optical beam into individual wavelength channels. An optical power device aligns the individual wavelength channels. An optical switch has at least one transflective polarizing element, at least one birefringent wedge and at least two polarization switches. The individual wavelength channels are directed to independently addressable regions of the polarization switches for wavelength selective switching. A second optical power device aligns the individual wavelength channels from the optical switch. A second dispersion device spatially combines individual wavelength channels from the second optical power device. At least one output optical waveguide receives at least one of the individual wavelength channels from the second dispersion device.

6 Claims, 17 Drawing Sheets

U.S. PATENT DOCUMENTS

2003/0058516 A1* 3/2003 Scott et al. .................. 359/246
2003/0103718 A1* 6/2003 Chen ........................... 385/22
2003/0108284 A1* 6/2003 Danagher et al. ............. 385/24
2007/0104418 A1* 5/2007 McGuire, Jr. ................ 382/16
2007/0159590 A1* 7/2007 Joubert et al. ............... 349/177

* cited by examiner

APPARATUS AND METHOD FOR OPTICAL SWITCHING WITH LIQUID CRYSTALS AND BIREFRINGENT WEDGES

CROSS REFERENCE TO RELATED APPLICATIONS

This application is a continuation-in-part of "Apparatus and Method for Optical Switching with Liquid Crystals and Birefringent Wedges", U.S. Ser. No. 11/318,068, filed Dec. 23, 2005, which claims the benefit of U.S. Provisional Patent Application entitled "A 1×M Optical Switch Utilizing Liquid Crystals and Birefringent Wedges", Ser. No. 60/639,107, filed Dec. 23, 2004.

FIELD OF THE INVENTION

The present invention relates to optics. More particularly, the invention relates to beam routing in wave-guided optical systems.

BACKGROUND OF THE INVENTION

A dense wavelength division multiplexed (DWDM) optical network, as with any information network, requires switches to perform routing of signals. DWDM networks pass several information channels along the same optical waveguide (e.g., optical fiber). Each channel corresponds to a different wavelength of light with the wavelengths typically separated by less than a nanometer. Consequently, DWDM networks require switches that are wavelength selective with very high resolution.

Regarding terminology, a 1×M optical switch comprises one input fiber (or port) and M output fibers (ports) to which the input can be selectively routed. A 1×M wavelength-selective switch similarly has one input port and M output ports and the capability of directing each of a number of discrete wavelengths from the input to any of the M output ports. The techniques of the invention may also be used to support M input fibers (ports) and 1 output fiber (port). Further, the techniques of the invention may be used to construct a system with M input fibers (ports) and M output fibers (ports).

For wavelength-selective optical switching, two commonly employed switching elements are micro-electromechanical (MEM) mirrors and liquid crystals (LC). These technologies use free space optics: the optical signal is removed from the fiber waveguide, manipulated using unguided optical components and then reinserted into an output fiber waveguide. Waveguided approaches (e.g., planar light circuits or PLCs) have been proposed for such functions but to date their promise has not been realized because of technical problems remaining to be overcome.

MEM micromirrors are constructed using microlithographic techniques. The mirrors are deformed or reoriented using electrostatic forces. Because of their small size and method of fabrication, it is straightforward to produce the arrays of mirrors required for wavelength-selective switching. Also, because the mirrors can take on a range of orientations they are conceptually easy to implement for higher port count wavelength-selective switches. It is the flexibility of the beam steering mechanism that makes MEM devices so promising and at the same time creates significant challenges for control and long term stability. MEM devices rely on steering a reflected beam; controlling the angle of reflection is paramount. Small deviations (<0.1 degree) in signal deflection can dramatically increase the coupling losses to an output port. Fabrication of the MEMs arrays requires an expensive processing facility, which makes them a costly solution for low volume applications.

Liquid crystal (LC) technology has a relatively long history in the prior art for optical switching applications. Liquid crystals are fluids that derive their anisotropic physical properties from the long range orientational order of their constituent molecules. Liquid crystals exhibit birefringence and the optic axis of a LC fluid can be reoriented by an electric field. This switchable birefringence is the mechanism underlying all applications of liquid crystals to optical switching and attenuation.

Two mechanisms have been proposed in the prior art for optical switching using liquid crystals: polarization modulation and total internal reflection (TIR). This refers to signal redirection to one of at least two channels (1×M switch; M>1). On/off liquid crystal optical switches can also be constructed on the principle of switchable scattering.

TIR liquid crystal switches rely on the difference in refractive index between the liquid crystal and the confining medium (e.g., glass). By proper choice of materials and angle of incidence of the light at the liquid crystal interface, it is possible to totally internally reflect the light when no field is applied to the liquid crystal. The effective index of the liquid crystal may be changed by reorienting the optic axis of the liquid crystal so that the total internal reflection criterion is no longer met; light then passes through the liquid crystal rather than reflecting from the interface. As with other types of reflective devices, such as MEM devices, controlling the reflection angle is critical. Also, since unwanted surface reflections are always present to some degree, crosstalk can be a significant problem.

Polarization modulation is the most common mechanism used in liquid crystal devices for optical switching. Switching is achieved between two orthogonal polarization states: for example, two orthogonal linear polarizations or left and right circular polarization. By way of illustration, a simple liquid crystal polarization modulator is shown in FIG. 1. The structure of the device is shown in cross-section FIG. 1a. A layer of nematic liquid crystal 1 is sandwiched between two transparent substrates 2 and 3. Transparent conducting electrodes 4 and 5 are coated on the inside surfaces of the substrates. The electrodes are connected to a voltage source 6 through an electrical switch 7. Directly adjacent to the liquid crystal surfaces are two alignment layers 8 and 9 (e.g., rubbed polyimide) that provide the surface anchoring required to orient the liquid crystal. The alignment is such that the optic axis of the liquid crystal is substantially the same through the liquid crystal and lies in the plane of the liquid crystal layer when the switch 7 is open. FIG. 1b depicts schematically the liquid crystal configuration in this case. The optic axis in the liquid crystal 10 is substantially the same everywhere throughout the liquid crystal layer. FIG. 1c shows the variation in optic axis orientation 12 as a result of molecular reorientation that occurs when the switch 7 is closed. The liquid crystal cell as described is known in the field as an electrically controlled birefringence device (or ECB). Such a liquid crystal polarization modulator was described in U.S. Pat. No. 5,276,747 as part of an optical switch/variable optical attenuator (VOA) for fiber optic communications applications.

To act as a switch, the modulator must produce two orthogonal polarizations at the exit of the modulator that can then be differentiated with additional optical components. This polarization conversion scheme provides the foundation for a number of electro-optic devices. If a linear polarizer is placed at the exit to the modulator, a simple on/off switch is obtained. If a polarizing beam splitter is placed at the exit, a 1×2 switch can be realized.

As an example, we consider a switchable half wave retardation plate. For this case, the liquid crystal layer thickness, d, and birefringence, Δn, are chosen so that $$\frac{\Delta nd}{\lambda} = \frac{1}{2} \quad (1)$$

where λ is the wavelength of the incident light. In this situation, with reference to FIG. 1b, if linearly polarized light with wave vector 13 is incident normal to the liquid crystal layer with its polarization 14 making an angle 15 of 45 degrees with the plane of the optic axis 10 of the liquid crystal, the light will exit the liquid crystal linearly polarized with its polarization direction 16 rotated by 90 degrees from the incident polarization 14.

Referring now to FIG. 1c, the optic axis in the liquid crystal is reoriented by a sufficiently high field. If the local optic axis in the liquid crystal makes an angle Θ with the wave vector k of the light, the effective birefringence at that point is $$\Delta n_{\mathit{eff}} = \frac{n_e n_o}{\sqrt{n_o^2 \cos^2\Theta + n_e^2 \sin^2\Theta}} - n_o, \quad (2)$$

where $n_o$ and $n_e$ are the ordinary and extraordinary indices of the liquid crystal, respectively. The optic axis in the central region of the liquid crystal layer is nearly along the propagation direction 13. In this case, according to Eq. 2, both the extraordinary 17 and ordinary components 18 of the polarization see nearly the same index of refraction. Ideally, if everywhere in the liquid crystal layer the optic axis were parallel to the direction of propagation, the medium would appear isotropic and the polarization of the exiting layer 19 would be the same as the incident light 14.

Besides the ECB device described above, a number of other liquid crystal devices can operate as polarization switches: 90° degree twisted nematic, 270° twisted nematic, and ferroelectric LC are three common examples.

While it is easy to conceptualize a 1×2 LC-based switch, unlike the MEM device technology, generalization to 1×M with M>2 is problematic because of the discrete 2-state nature of the polarization switching. Cascading schemes have been proposed for broadband signal routing; however, these approaches are not amenable to wavelength-selective switching in a DWDM network.

The liquid crystal device of FIG. 1 is appropriate for broadband signal routing. However, for wavelength-selective switching, a liquid crystal device with more than one independently switchable element (pixel) is useful. A 1×N linear array of N separately addressable pixels is illustrated in FIG. 2. The structural cross-section of this LC array is identical to that of FIG. 1a. The liquid crystal is confined between two glass substrates 202 and 204 by means of a seal 206. Substrate 202 has one continuous electrode 208 which serves as the common electrode for the pixels. Substrate 204 has an array of N photolithographically patterned electrodes 210. Each pixel 212 is defined by the region of overlap between the common electrode and one of the patterned electrodes. By applying an independent voltage to each patterned electrode, the electro-optic response of each pixel in the array can be separately controlled.

SUMMARY OF THE INVENTION

The invention includes an optical switching apparatus with at least one optical waveguide to deliver at least one input optical beam. A dispersion device spatially separates the at least one input optical beam into individual wavelength channels. An optical power device aligns the individual wavelength channels. An optical switch has at least one transflective polarizing element, at least one birefringent wedge and at least two polarization switches. The individual wavelength channels are directed to independently addressable regions of the polarization switches for wavelength selective switching. A second optical power device aligns the individual wavelength channels from the optical switch. A second dispersion device spatially combines individual wavelength channels from the second optical power device. At least one output optical waveguide receives at least one of the individual wavelength channels from the second dispersion device.

The invention also includes an optical switch with an ingress polarization switch, a transflective polarizing element, and an assembly including at least one birefringent wedge and at least two polarization switches. The ingress polarization switch is operative to produce a first polarization state and a second polarization state. The transflective polarizing element transmits the first polarization state and reflects the second polarization state. Individual wavelength channels are directed to independently addressable regions of the at least two polarization switches for wavelength selective switching.

BRIEF DESCRIPTION OF THE DRAWINGS

The invention is more fully appreciated in connection with the following detailed description taken in conjunction with the accompanying drawings, in which:

FIG. 5b is the same as FIG. 5a except that the LC cell is in its high voltage state and the polarization of the incident light as unchanged by the cell. In this case, the polarization of the beam passing through the birefringent wedge is perpendicular to the optic axis and the beam is deflected less than the case in FIG. 5a.

FIG. 10b shows a detail of the LC/wedge switching assembly for the switch of FIG. 10a.

FIG. 10c is a detailed schematic of the output port fiber coupling optics for the switch of FIG. 10a.

FIG. 11b shows a detail of the LC/wedge switching assembly for the switch of FIG. 11a.

FIG. 11c is a detailed schematic of the input/output port fiber coupling optics for the switch of FIG. 11a.

Like reference numerals refer to corresponding parts throughout the several views of the drawings.

DETAILED DESCRIPTION OF THE INVENTION

Figure 3:
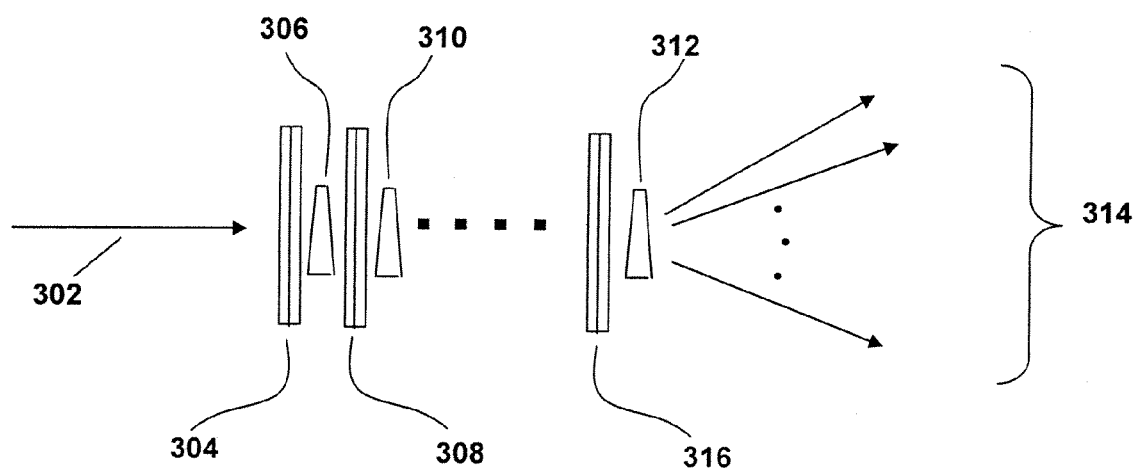
FIG. 3 is a schematic illustration of the liquid crystal and birefringent wedge assembly of the current invention. An input beam of linearly polarized light passing through the assembly with M LC cells and M wedges can be selectively directed into any one of $2^M$ output directions.

FIG. 3 is a schematic illustration of the operation principle of the current invention. The switch comprises a number M of liquid crystal polarization switches interleaved with M birefringent wedges. Referring to the figure, linearly polarized light 302 is incident from the left and passes in serial fashion through LC Switch 1 304, Birefringent Wedge 1 306, LC Switch 2 308, Birefringent Wedge 2 310, and so on until it exits from Birefringent Wedge M 312. Depending on the state of each of the LC switches, the output beam is deflected into a particular one of $2^M$ directions 314.

Figure 4A:
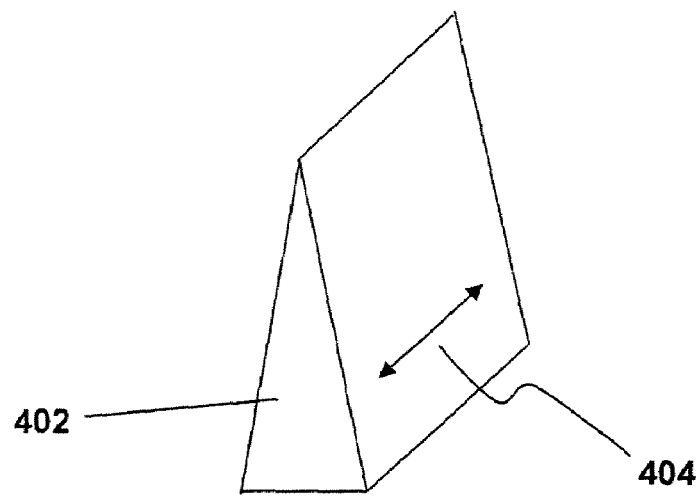
FIG. 4a illustrates a prior art birefringent wedge whose optic axis is orthogonal to the sides of the wedge.
Figure 4B:
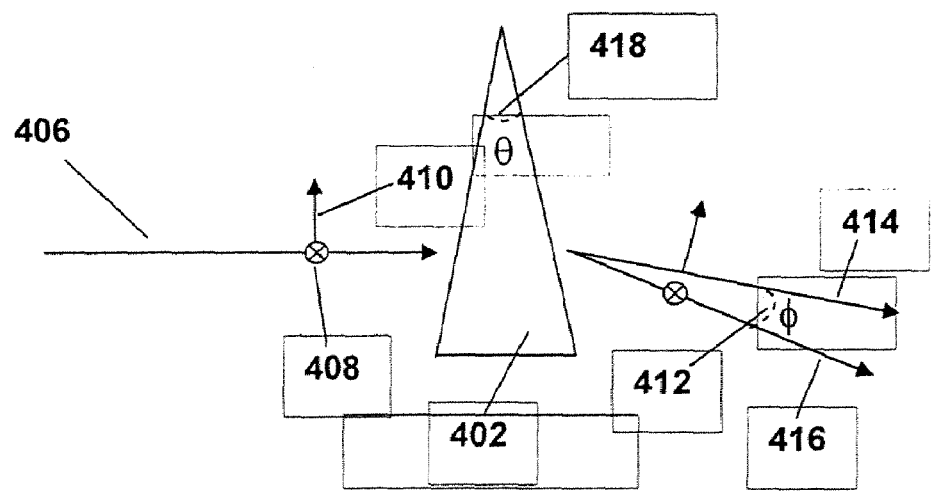
FIG. 4b illustrates the effect that the wedge of FIG. 4a has on incoming polarized light. Light polarized parallel to the optic axis is deflected at a larger angle from the direction of the incident beam than light polarized orthogonal to the optic axis.

To understand this more clearly, refer to FIG. 4. FIG. 4a is a perspective view a birefringent wedge 402. In this figure, the optic axis of the birefringent material 404 is indicated as lying in the horizontal plane when the apex of the wedge points vertically. That is, it is parallel to the vertex edge of the wedge. It is not a requirement of this invention that the optic axis be so oriented, but it is chosen for illustrative purposes in elucidating an embodiment of the invention. FIG. 4b illustrates the impact that such a birefringent wedge has on a beam of polarized light passing through it. If the incident beam 406 has polarization 408 parallel to the optic axis (i.e. an extraordinary ray), the action of the wedge is to deflect the beam away from the vertex upon exit. The deflection angle depends substantially linearly on the extraordinary index of refraction, $n_e$, of the wedge and the wedge angle θ. On the other hand, if the incident beam has polarization 410 orthogonal to the optic axis (i.e. an ordinary ray), the deflection angle upon exit will depend on the ordinary index, $n_o$, and consequently there will be an angular different φ 412 between the ordinary 414 and extraordinary rays 416 upon exiting the wedge. This separation angle φ depends substantially linearly on the wedge angle θ 418 and the birefringence, $n_e-n_o$, of the wedge. Of course, if the input polarization is a combination of both polarizations, the input beam will be partially diverted into both exit directions. This is not desirable for a switch application where the beam should be routed into either one or the other of the two directions. FIG. 4b presumes that the extraordinary index of the wedge is great than the ordinary index ($n_e>n_o$) resulting in a greater deflection of the extraordinary ray. If $n_o>n_e$ then the ordinary ray will have the greater deflection. To avoid confusion, all examples and embodiments assume that $n_e>n_o$ but note that this is not a requirement of the invention.

Figure 5A:
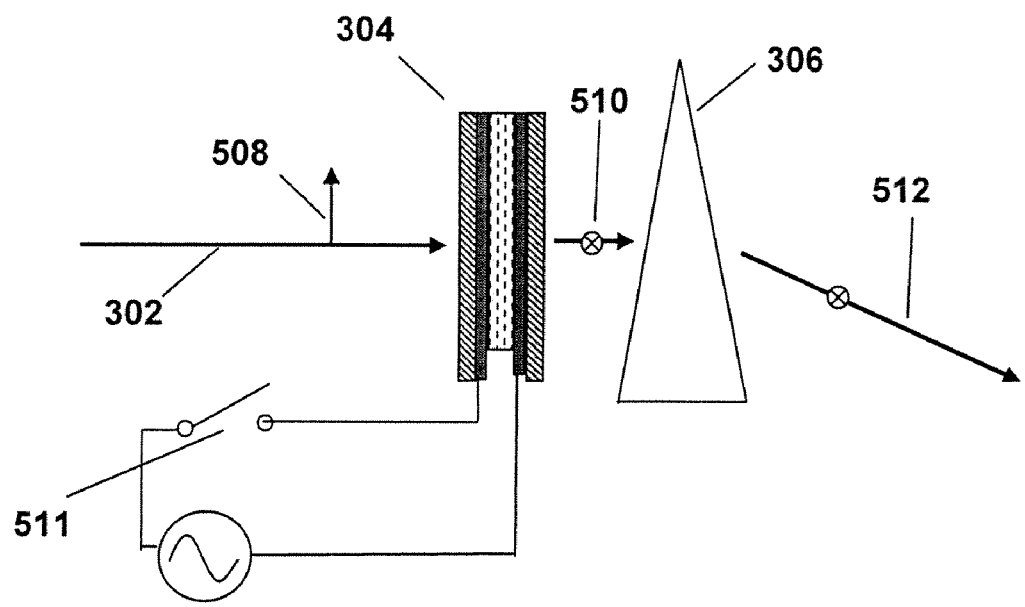
FIG. 5a is a detailed schematic of a single stage of the LC/wedge assembly of FIG. 4. A vertically polarized incident beam is converted to horizontally polarized light by the LC cell in its low voltage state and is subsequently deflected by the birefringent wedge. The optic axis of the wedge is oriented as in FIG. 3 so that the polarization of the light is parallel to the optic axis.
Figure 5B:
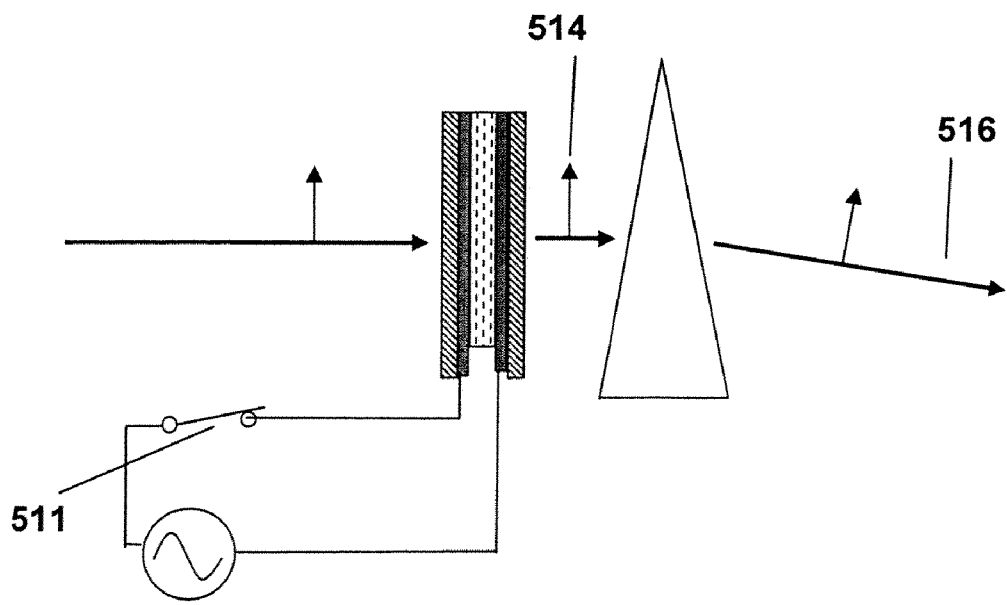

FIG. 5 illustrates the operation of the first stage of the LC/wedge assembly of FIG. 3. The wedge is presumed to have the same optic axis orientation as in FIG. 4 with $n_e>n_o$. Referring to FIG. 5a, a beam of light is incident from the left on the LC switching cell. The incident beam 302 is linearly polarized in the vertical direction 508. Upon passing through the LC switch cell 304 in its low voltage state (electrical switch 511 open), the polarization 510 is rotated 90° so that it passes through the birefringent wedge 306 as an extraordinary ray and is deflected accordingly. Referring now to FIG. 5b, the same incident beam when passing through the LC, here in its high voltage state (electrical switch 511 closed), experiences no polarization change and passes through the wedge as an ordinary ray and is deflected through a smaller angle than for the low voltage state of the LC. Hence, LC Switch 1 and Birefringent Wedge 1 produce two possible output directions 512 and 516 for the incident beam as indicated in FIGS. 5a and 5b respectively. Each of these output beams can be steered into two further directions by the action of LC Switch 2 and Birefringent Wedge 2, resulting in 4 possible beam propagation directions after the second stage of the assembly. Continuing in similar fashion, for an assembly of M stages, there are $2^M$ possible output propagation directions for the exit beam.

This preceding discussion gives a conceptual overview of the invention but ignores some significant details that are necessary to produce a useful device for routing or wavelength selective switching in a DWDM fiber optic network.

First, in a fiber optic network, the light does not have a controlled polarization. This results from polarization modification by optical components in the system (e.g. optical amplifiers, gain equalizers, attenuators) as well as ubiquitous form and strain birefringence in the fiber itself. Hence, the LC/wedge assembly described above is useless in such a network unless a means is provided to achieve a well-defined, controlled polarization for the optical beam prior to entering the switch assembly. This is, of course, a common problem for which solutions have been described in the prior art.

Figure 6A:
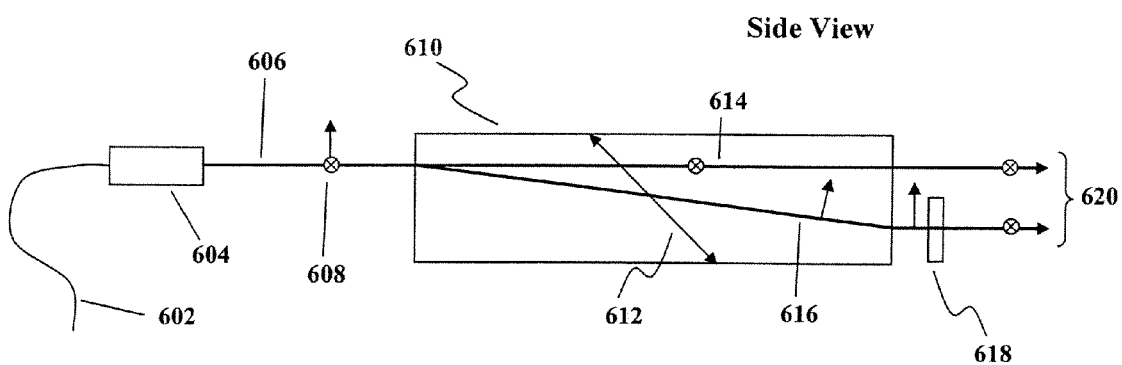
FIG. 6a is a side view of a prior art structure for converting an arbitrarily polarized beam from an optical fiber into two parallel beams with identical polarization.
Figure 6B:
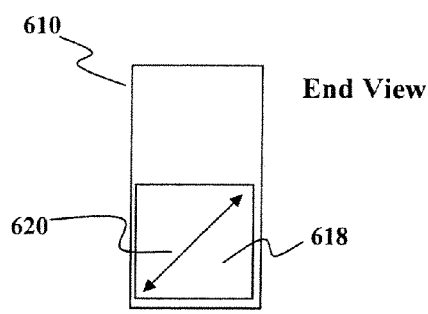
FIG. 6b is an end-on view of the prior art structure of FIG. 6a showing the orientation of the optic axis of the half wave plate used to convert the polarization of the extraordinary ray to that of the ordinary ray.

FIG. 6 illustrates perhaps the most widely used means to address this problem. Referring to FIG. 6a, light exits an optical fiber 602 and passes through a system with optical power (a collimator) 604 which collimates the light into a beam 606 of arbitrary polarization 608. This beam is passed through a birefringent crystal 610 of sufficient length and proper optic axis orientation 612 to separate the ordinary 614 and extraordinary 616 beams sufficiently so that they do not overlap at the exit surface of the crystal. (In such an application, the birefringent crystal is known to those familiar with the art as a beam displacer (BD) or a walkoff crystal.) One of the beams (shown as the extraordinary beam in FIG. 6a) is then passed through a half wave retardation plate 618 which rotates the beam's polarization by 90° so that there are two parallel beams 620 with identical and well-defined linear polarization. FIG. 6b is an end view of the crystal showing the orientation of the optic axis 622 of the half wave retardation plate which produces the desired 90° rotation of polarization for the optical system as presented in FIG. 6a. This scheme operates also in reverse so that two parallel beams of identical polarization can be combined and coupled into an optical fiber using the same configuration of elements. Henceforth, the optical assembly as shown in FIGS. 6a and 6b and described above shall be referred to as a fiber coupling assembly, whether it be at the input or output of a fiber.

Figure 7A:
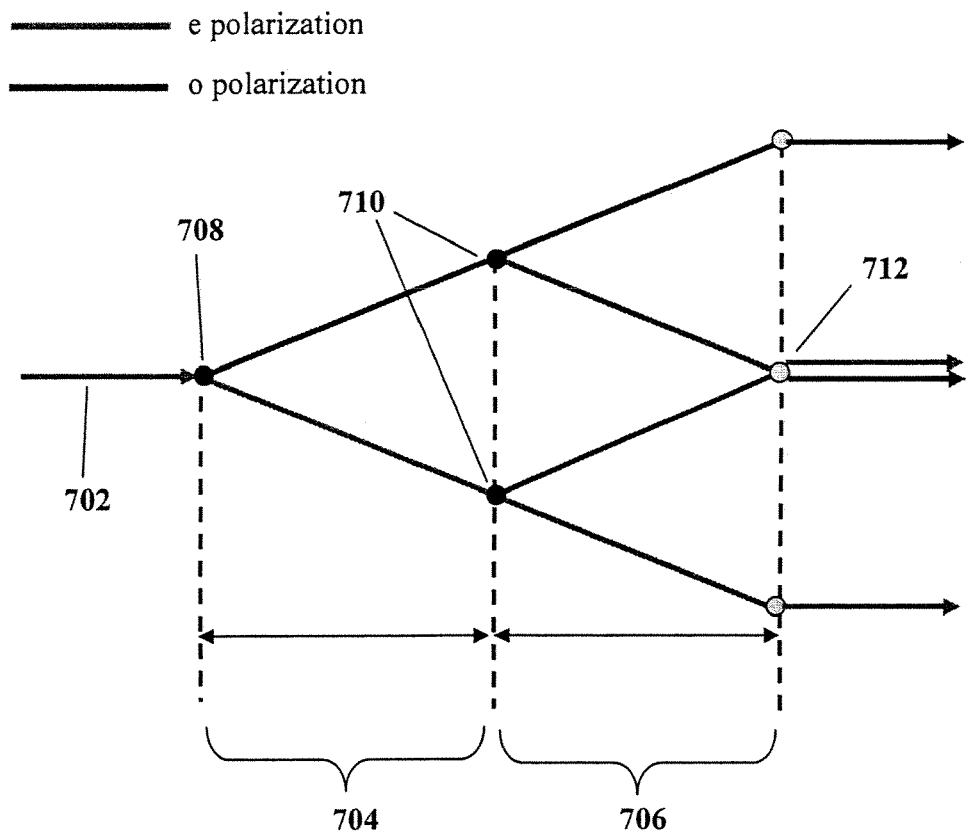
FIG. 7a is bifurcation diagram for a 1×4 switch according to an embodiment of the invention when the wedge angles for the two wedges are identical.

Unlike prior art switches using liquid crystals and beam displacers which produce a spatial separation of parallel beams, this invention produces an angular discrimination. Consequently, the wedge angles are chosen so that beams corresponding to different switch states exit the switching assembly at sufficiently separated angles to be distinguishable. As an example, consider a 1×4 switch with two LC switches and two birefringent wedges. For concreteness, here we consider both stages of the switch to be configured as in FIG. 5. Then the optic axes of the wedges are parallel, and we refer to light polarized parallel to this direction as e-polarized. If the wedges are identical, two of the switch states will produce the typically undesirable situation of two of the four possible beams propagating in the same direction upon exit from the switching assembly. This is illustrated in FIG. 7a which is the switching bifurcation diagram for this situation. The bifurcation diagram is a pictorial representation of the impact the switching assembly has on an input beam of light. Referring to FIG. 7a, light 702 of well-defined polarization, here shown as e-polarized for purposes of illustration, is input from the left and passes through the two stages 704 and 706 of the switch to the output. Each stage comprises the operations of a switch cell and a birefringent wedge. At the entrance to each stage there is one or more switching nodes; the first stage has one input node 708 and the second has two input nodes 710. The two lines emanating from each node represent the deflections of the two orthogonal polarizations (e-polarization and o-polarization) selectable by each switch cell. Vertical displacement represents relative angular separation of the different possible beam trajectories through the assembly. In that sense, only the vertical positions at the exit of each stage has physical meaning. However, if the lengths of the stages are equal in the diagram, the angle between the two lines emanating from each node will be proportional to the angle φ between the e-ray and o-ray as in FIG. 4b. (This is true as long as the wedge angle θ is small enough so that sin θ≈θ.) Each continuous path from the input to the output represents a state of the switch. We can designate each path by the polarization of the light in each stage. For example, (e,e) indicates the path traversed when the beam is e-polarized in both stages of the switch. Using this notation, we observe from FIG. 7a that paths (e,o) and (o,e) exit the switch assembly at the same angle since they intersect at an exit node 712.

Figure 7B:
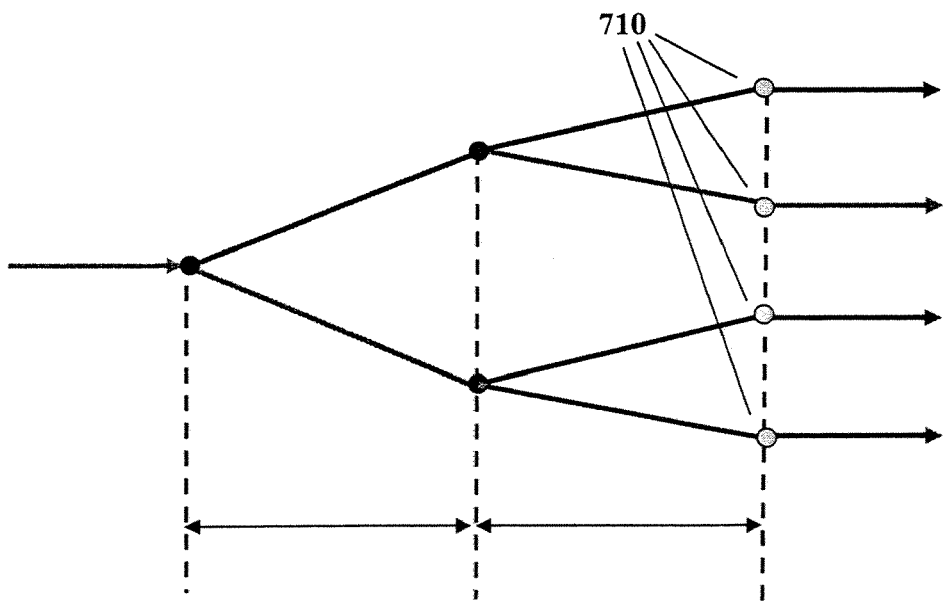
FIG. 7b is bifurcation diagram for a 1×4 switch according to an embodiment of the invention when the wedge angles for the two wedges are θ and 2θ.

To obtain equal angular separation between the 4 beams, if one wedge has wedge angle θ, the other wedge will have a wedge angle of 2θ again provided that sin θ≈θ. This is illustrated by the bifurcation diagram of FIG. 7b, which shows the 4 exit nodes 714 equally spaced in the vertical direction. In FIG. 7b, the wedge with the larger wedge angle is in Stage 1 704. However, the order of the wedges does not substantially affect the relative angular displacement of the output beams, although beams with the same angular deflection will correspond to different switch states if the wedges are interchanged.

Figure 8:
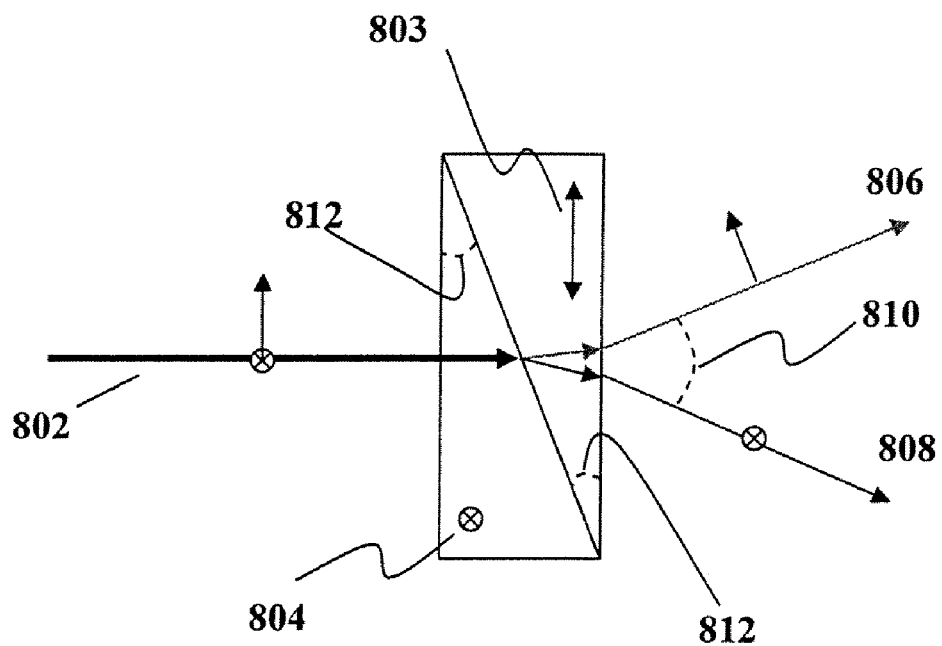
FIG. 8 is a schematic diagram showing the operating principal of a prior art Wollaston polarizer.

Finally, we observe that, as FIG. 4 illustrates, both the e-ray and o-ray are deflected away from the birefringent wedge vertex and not symmetrically with respect to the input beam direction. If the wedges are all oriented the same, upon passage through successive stages of the switch, the deflected beams will be steered further from the input beam direction. This may be undesirable for certain switch geometries, and in particular, is extremely detrimental to the design of a 1×M wavelength switch. This problem can be mitigated in a few ways. One simple way to lessen the deflection for more than one stage is to alternate the orientation of the wedges, so that the vertices point in opposite directions. This will lessen the deflection, but cannot produce M beams uniformly distributed about the incident direction. Another means which can produce such a uniform distribution is a wedge made of isotropic material. A third approach is to replace a birefringent wedge with a birefringent wedge pair whose optic axes 802 and 803 are orthogonal as illustrated in FIG. 8. This configuration is known in the art as a Wollaston polarizer. It has the property that for a normally incident beam 804, the beam is split into two orthogonally polarized beams 806 and 808 whose deviations are symmetric with respect to the incident direction of propagation. To obtain the same angular deviation φ 810 between the two beams as is achieved in the single wedge case, the wedge angle 812 for each member of the Wollaston pair should be half of that for the single wedge design.

Figure 9:
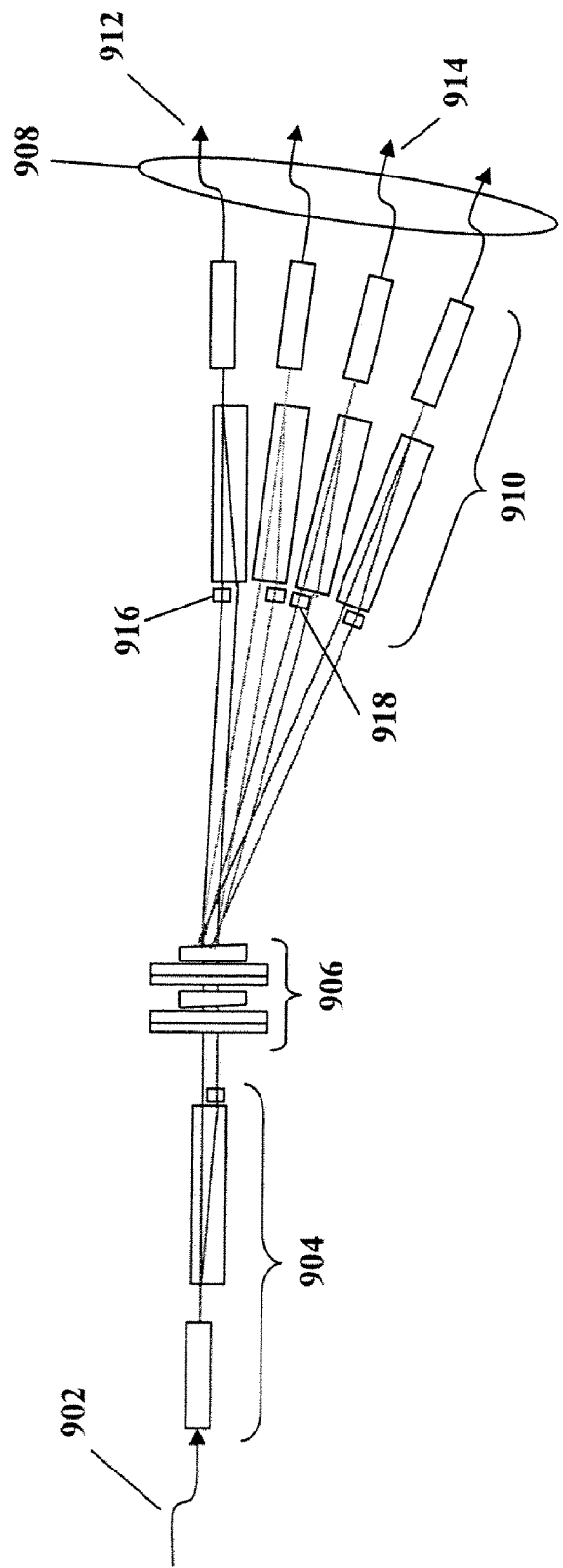
FIG. 9 is an embodiment of a broadband 1×4 optical switch according to an embodiment of the current invention.

FIG. 9 illustrates a first embodiment of the invention. It is a 1×4 optical routing switch for a fiber optic system. It is not wavelength specific. Light exits the input fiber 902 and passes through a collimator/BD/retarder coupling assembly 904. The two parallel beams then pass through the LC/wedge switching assembly 906 and through the action of the switch the beams are deflected to 1 of 4 output ports 908. Each output port contains a retarder/BD/collimator assembly 910 for coupling to that port's output fiber. The switch assembly is for concreteness here assumed to have its LC and wedge configuration according to the bifurcation diagram of FIG. 7b. With reference to FIG. 7b, it is clear that two of the beams output from the switch assembly have their polarizations orthogonal to the input polarization. For these two beams, which correspond to output ports 1 912 and 3 914 in FIG. 9, the half wave retarders 916 and 918 in the coupling assembly must be moved, as shown in the figure, to the opposite beam in the pair from that of the retarder at the input coupling assembly. Otherwise, these beams will not couple into the fiber.

Figure 10A:
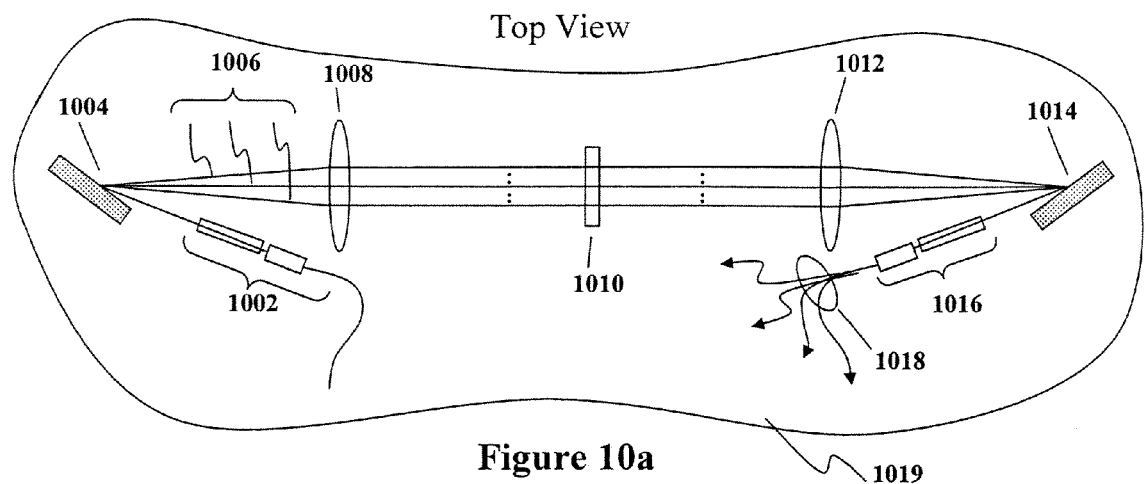
FIG. 10a is an embodiment of a 1×4 wavelength selective switch according to an embodiment of the current invention which operates exclusively in transmission.

FIG. 10 illustrates a second embodiment which functions as a 1×4 wavelength switch for a WDM fiber optic network. With reference to FIG. 10a, this device comprises (1) an input fiber coupling assembly 1002 (i.e. collimator/BD/waveplate) which provides two parallel beams of identical polarization, (2) a dispersive means 1004 (e.g., a grating) which takes these polarized beams and separates them into their component wavelengths 1006, (3) a means with optical power 1008 (e.g. a lens) in the path of the dispersed beams which serves two functions: it converts the diverging dispersed beams into an array of parallel beams and focuses the beams on the switching assembly, (4) an LC/wedge switching assembly 1010, (5) a second means with optical power 1012 (lens) that performs the inverse functions of the first means with optical power, collimating the dispersed beams and focusing these beams to the same point on (6) a second dispersive means 1014 (e.g., a second grating) which combines the dispersed beams into one or more pairs of parallel beams which are directed to (7) an array of output coupling optics 1016 for connecting each pair of beams to one of the output port fibers 1018.

Figure 10B:
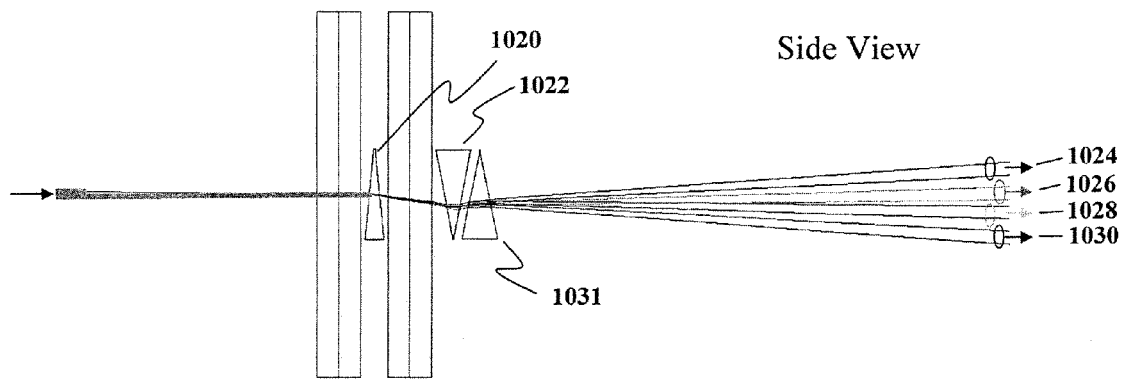
Figure 10C:
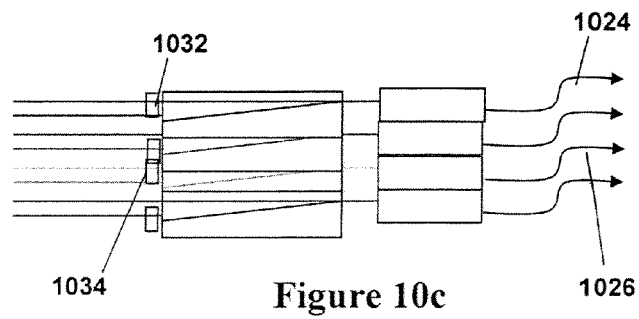
Figure 11A:
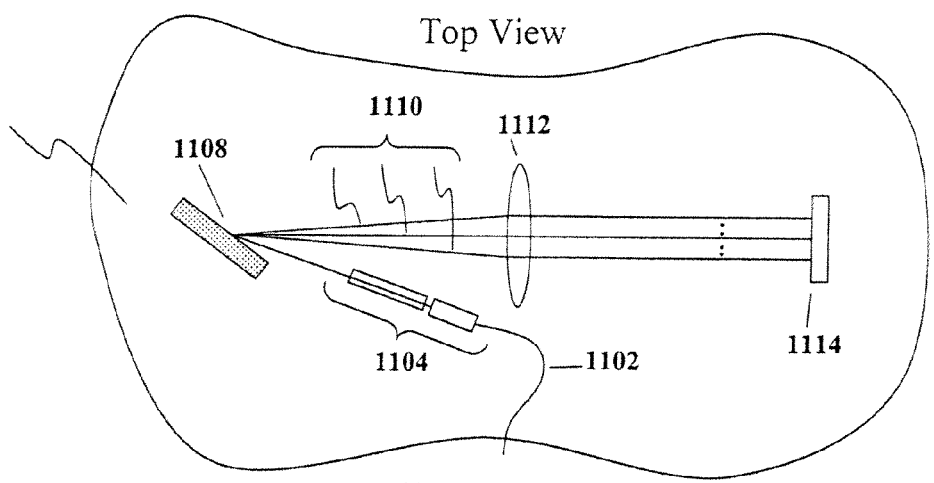
FIG. 11a is an embodiment of a 1×4 wavelength selective switch according to an embodiment of the current invention which operates exclusively in reflection.
Figure 11B:
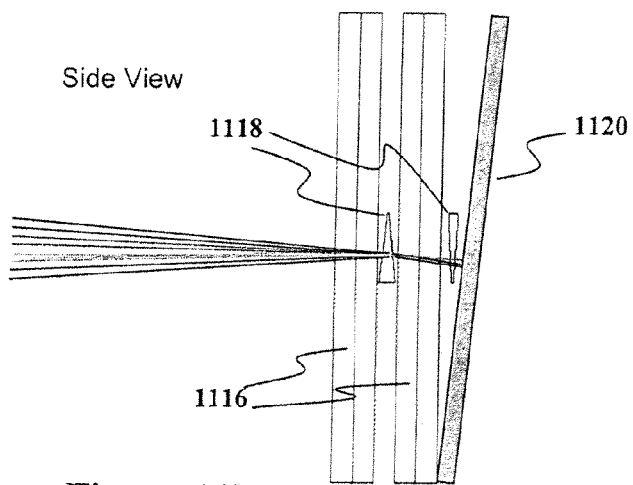
Figure 11C:
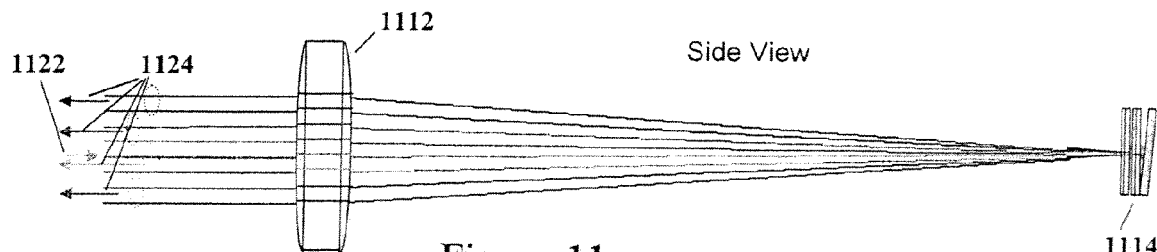
Figure 11D:
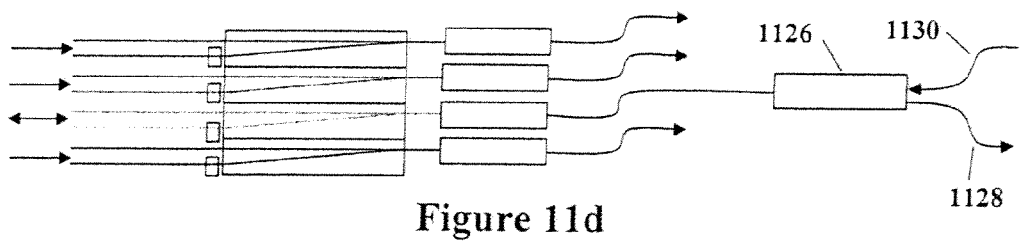
FIG. 11d illustrates output beams sharing a fiber coupling assembly.

A side view detail of the switching assembly is shown in FIG. 10b. The wedge angles of the birefringent wedges 1020 and 1022 are θ and 2θ respectively, in order of passage by the light. This is the reverse of the situation described earlier with reference to the bifurcation diagram of FIG. 7b and results in different routing paths. (Additionally, here one of the wedges is inverted.) Beam path (o,e) goes to Port#1 1024; path (e,o) goes to Port #2 1026; path (e,e) goes to Port #3 1028; and path (e,o) goes to Port #4 1030. Since the two e-polarized exit beams go to Ports #1 and #3, the half wave retardation plates on the coupling assemblies for these two ports (1032 and 1034, respectively) must be reversed from that of the input as shown in the detail of the output coupling assembly array (FIG. 10c). As noted earlier and practiced here, the two birefringent wedges have their wedge angles opposed to reduce steering of the beam either toward or away from the optical mounting base 1019. A third (isotropic) wedge 1031 is also included, as illustrated in FIG. 10b to adjust the output beams so that they are symmetrically distributed about the centerline of the optical system. Regarding the wedge angle θ of the birefringent wedges, it must be chosen large enough so that the beams traveling to the different ports are sufficiently separated that light intended for one port is not captured by an adjacent port (i.e., good port isolation). This undesirable coupling is known as port crosstalk. The required angle θ depends on the beam diameter as well as the focal length of the lens. Generally speaking, the minimum allowable θ to achieve the required performance will vary directly with the beam diameter and inversely with the focal length of the lens.

Figure 1A:
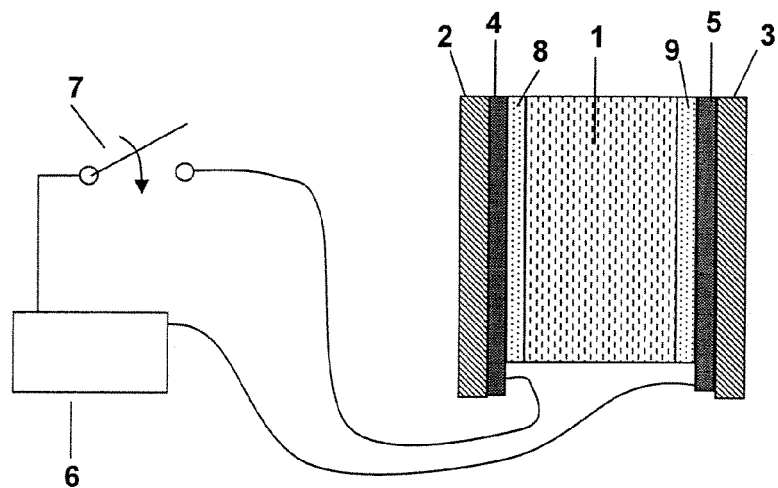
FIG. 1a is a schematic drawing of a prior art electrically-driven liquid crystal cell that may be used as a polarization rotator in an embodiment of the current invention.
Figure 1B:
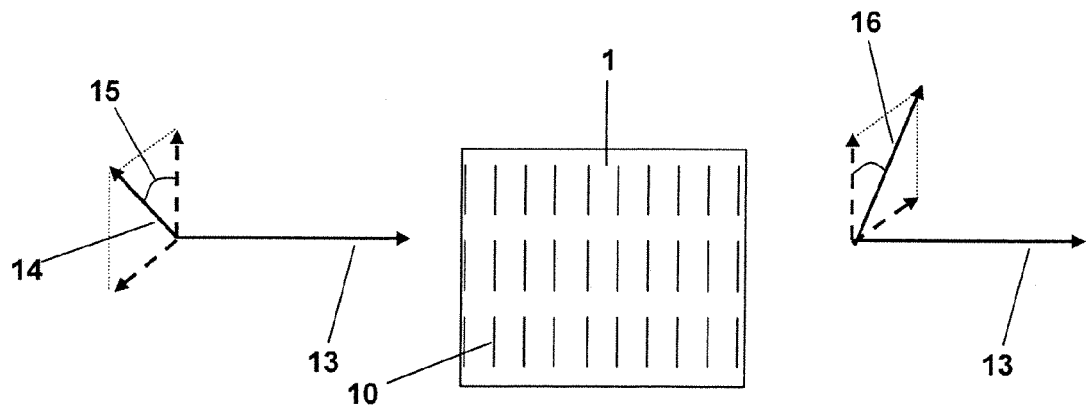
FIG. 1b is a schematic illustrating the rotation of the polarization of linearly polarized light by 90° upon passage through the liquid crystal cell of FIG. 1a when no voltage is applied to the cell.
Figure 1C:
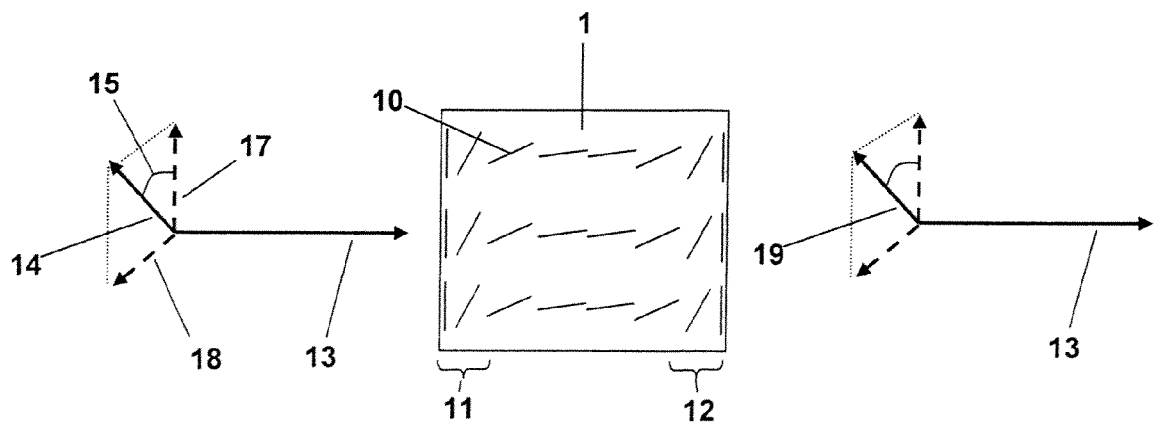
FIG. 1c is a schematic illustrating no rotation of the polarization of incident linearly polarized light upon passage through the liquid crystal cell of FIG. 1a when sufficiently high voltage is applied to the cell.
Figure 2:
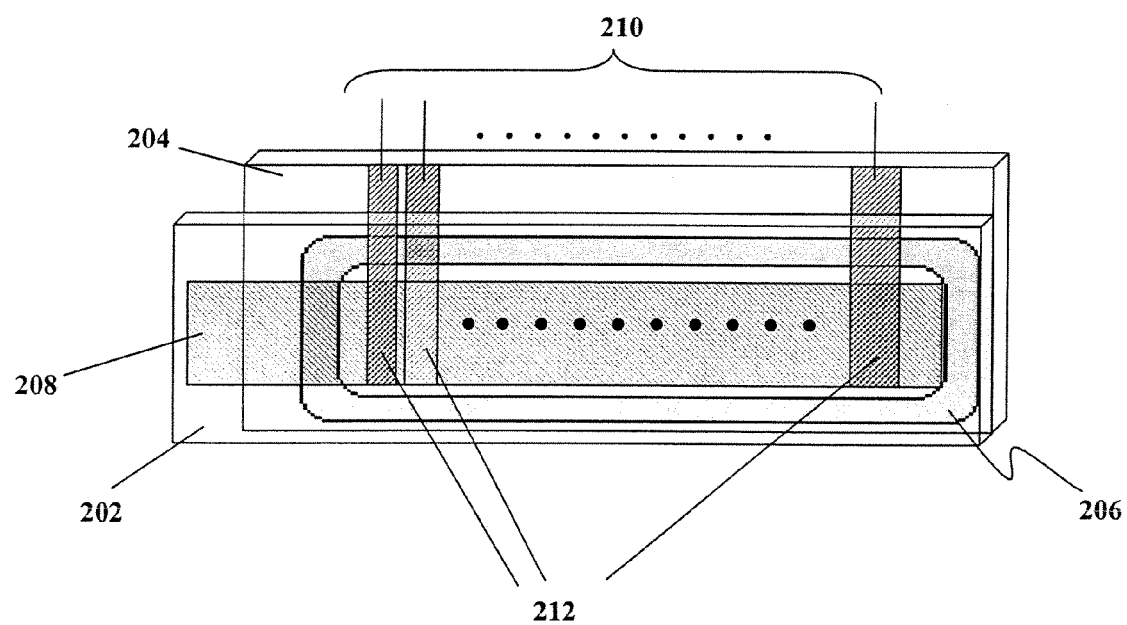
FIG. 2 is a schematic illustration of a prior art liquid crystal cell containing an array of pixels which can be independently activated by an applied voltage.

Each liquid crystal cell in FIG. 10b comprises a 1×N array of pixels as in FIG. 2, one pixel for each of the N wavelengths in the multiplexed signal. The two LC cells have their pixel arrays aligned such that a particular wavelength $\lambda_k$, passes through the $k^{th}$ pixel in both arrays, where k is an integer from 1 to N. Every pixel in both arrays is individually drivable with a voltage, so that each wavelength can be independently steered to any one of the 4 output ports.

Before leaving this embodiment of a wavelength-selective routing switch, note that for proper operation of the device, the two dispersive means as well as the two means with optical power should be optically identical or at least very nearly so. It has been taught in the prior art that if this is not the case, it will not be possible to multiplex the demultiplexed beams and couple them efficiently into the output ports. It has been further taught that not only must these elements be identical, they must be oriented very precisely with respect to each other. More specifically, they must have mirror symmetry with respect to a plane which is midway between the two means with optical power and oriented normal to the line joining the centers of these means. This makes system alignment very sensitive. A reflective design which uses the same dispersive means and the same means with optical power for both the input and output stages can remove much of this alignment sensitivity.

FIG. 11 is a third embodiment of a 1×4 wavelength-selective switch that contains a reflective means, thereby eliminating the second means with optical power as well as the second dispersive means of the previous embodiment. With reference to FIG. 11a, light containing N discrete wavelengths exits the input fiber 1102, passing first through an input coupling assembly 1104 which produces two parallel beams with the same polarization. A dispersive means 1108 (here a diffraction grating) separates the beams into N pairs of beams 1110, one pair for each component wavelength. A means with optical power 1112 (here a convex spherical lens) focuses the separate beams onto the LC switch assembly 1114. A reflective means after the switch assembly then returns the light in reverse order back through the LC assembly, the means with optical power, and the dispersive means after which it is coupled back to 1 of 4 four output ports via the coupling array. A detail of the switching assembly is illustrated in FIG. 11b. Each liquid crystal cell 1116 in FIG. 11b comprises a 1×N array of pixels as in FIG. 2, one pixel for each of the N wavelengths in the multiplexed signal. The two LC cells have their pixel arrays aligned such that a particular wavelength $\lambda_k$, passes through the $k^{th}$ pixel in both arrays. Every pixel in both arrays is individually drivable with a voltage, so that each wavelength can be independently steered to any one of the 4 output ports. In this embodiment, the wedge angles of the birefringent wedges 1118 are 2θ and θ respectively, in order of passage by the light. No isotropic prism or other correction means is required for beam steering because the mirror 1120 in the switch assembly can be tilted to direct the reflected beams back along the desired path. FIG. 11c shows the relative positions of input beam 1122 and return beam paths 1124 through the lens and switching assembly as determined by the tilt of the mirror as in FIG. 11b. In particular, the mirror angle has been chosen in this embodiment so that the input beam and the reflected beam for Port #3 overlap. This overlap is not a requirement but offers the advantage of minimizing the overall height of the system. The input and Port #3 output beams consequently share the same fiber coupling assembly as illustrated in FIG. 11d. An optical circulator 1126 is added to this port to separate the Port #3 output 1128 from the input 1130 as shown in FIG. 11d. Another advantage of this configuration is that any light beam directed into one of the ports 1, 2, and 4 will, with the appropriate selection of switch voltages, retrace the paths outlined above and will exit through Port #3. The same switch voltages that allow the input beam from Port #3 to be directed to each of the ports 1, 2 or 4 will correspondingly direct any wavelength coming into those ports to be directed to output Port #3. Thus, adding circulators to any of the ports 1, 2 or 4 will allow them to be used as both add and drop ports in an optical network.

Figure 12:
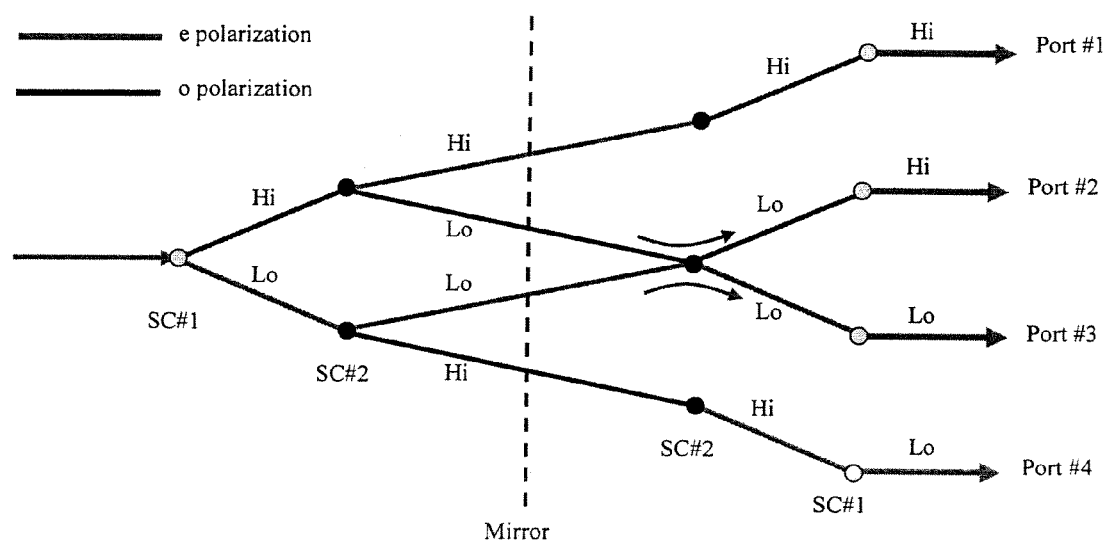
FIG. 12 is the bifurcation diagram for the embodiment of FIG. 11.

Two additional points on the reflective embodiment can be made. First, because of the double pass of the light through the wedges, the wedge angle θ is half of that of the transmitted embodiment described previously to achieve the same port separation, provided that the beam widths and lens focal lengths are the same for both embodiments. Secondly, again because of the double pass through the switching assembly, the polarizations of all of the beams exiting the assembly are identical. This point is illustrated in FIG. 12, the bifurcation diagram for this embodiment. Hence, the configurations of the fiber coupling optics for all of the ports are identical including the positions of the half wave retardation plates.

Figure 13A:
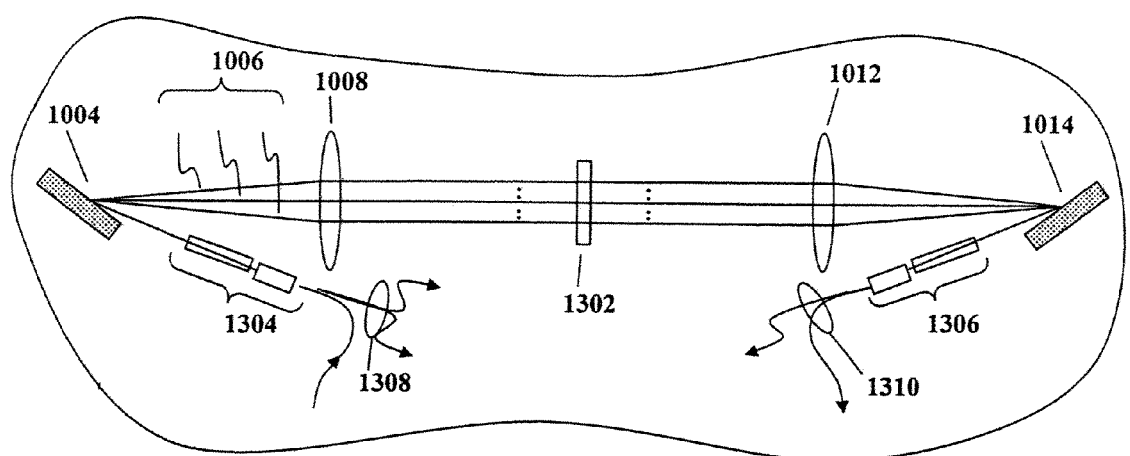
FIG. 13a is an embodiment of a 1×4 wavelength selective switch according to an embodiment of the invention that operates partly in reflection and partly in transmission through the inclusion, in the switching assembly, of a polarizer which reflects one linear polarization and transmits an orthogonal polarization.

A fourth embodiment to be considered is a 1×4 wavelength selective switch that incorporates both transmitted ports (in the sense of the second embodiment) and reflected ports (in the sense of the 3$^{rd}$ embodiment) through the introduction of a transflective polarizer (i.e. a polarizer that transmits one linear polarization and retro-reflects the orthogonal polarization). Such transflective polarizers are extant in the art. Referring to FIG. 13a, which is a schematic of this embodiment, and comparing to FIG. 10a, observe that from the perspective shown, there is little apparent difference between the two embodiments. The differences occur in the structure of the switch assembly 1302, the input/output coupling array 1304 and the output coupling array 1306 that are required to produce two reflected ports 1308 and two transmitted ports 1310. The differences are elucidated in FIGS. 13b, 13c and 13d.

Figure 13B:
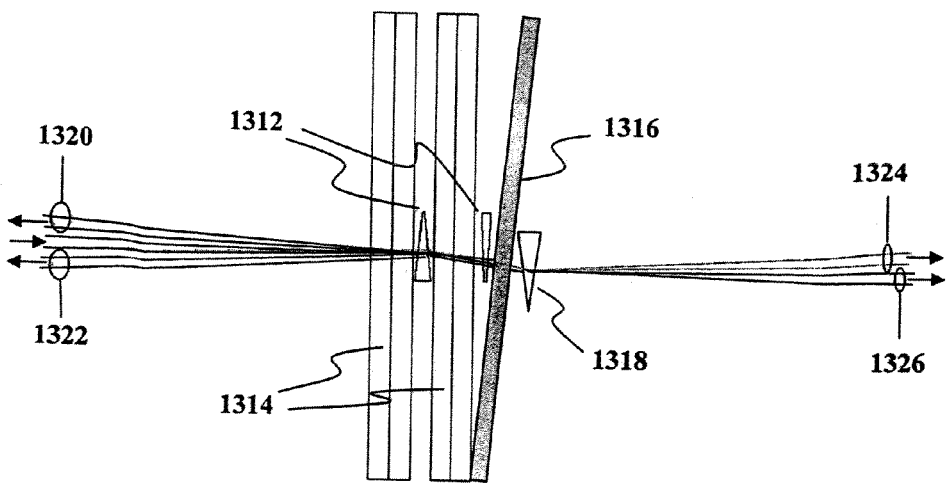
FIG. 13b shows a detail of the LC/wedge switching assembly for the switch of FIG. 9.
Figure 13C:
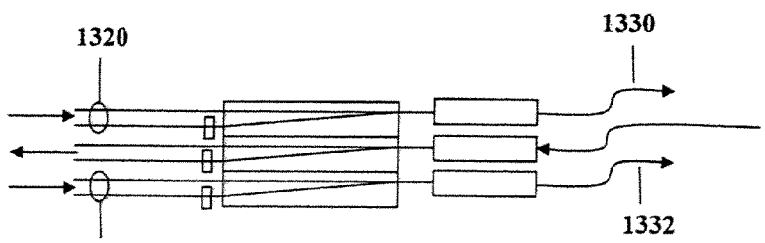
FIG. 13c is a detailed schematic of the input/reflected output port fiber coupling optics for the switch of FIG. 9.
Figure 13D:
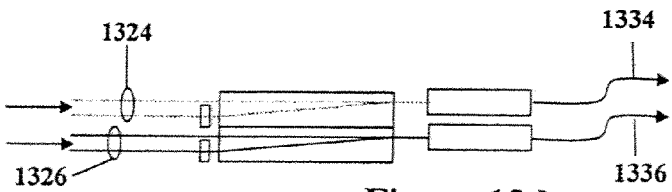
FIG. 13d is a detailed schematic of the transmitted output port fiber coupling optics for the switch of FIG. 9.

FIG. 13b is a side view of the optical switching assembly for this embodiment. As in the previous embodiment, there are two liquid crystal arrays 1314 with N elements for individually routing N wavelengths and two birefringent wedges 1312, the first with wedge angle 2θ and the second with wedge angle θ. A transflective polarizer 1316 is placed after the second wedge; its transmitting axis is parallel to one polarization of the light exiting the second wedge and orthogonal to the other. As with the previous embodiment, the polarizer is tilted to direct the two reflected beam pairs 1320 and 1322 backward through the system to the reflected output port fibers 1330 and 1332. An isotropic wedge 1318 is included after the polarizer to steer the beam pairs 1324 and 1326 transmitted through the polarizer to the transmitted output port fibers 1334 and 1336. It is advantageous, but not required, to choose the transmitting axis of the polarizer to be parallel to the polarization of the input beam as it enters the first LC cell. In that situation, the transmitted beams and the reflected beams have the same polarization as the input upon exiting the switch assembly and consequently all of the fiber coupling assemblies are identical. This is illustrated in FIG. 13c for the input and reflected ports and FIG. 13d for the transmitted ports. With reference to FIGS. 13c and 13d, it is apparent that the spacing between the transmitted ports is half that of the reflected ports. This is a consequence of the double pass through the birefringent wedges for the reflected beams.

All of the embodiments described above for wavelength switching (i.e. embodiments 2 through 5) have their output collimators in a stacked configuration. Ideally, with perfectly aligned optics and the absence of lens aberrations, the orientation and spacing between the collimators would be identical. However, this is never the case in practice. Aligning and fixing the collimators in place is a critical step in the fabrication of these devices. Standard collimator holder arrays with fixed positions for each waveguide make this task extremely difficult, since each waveguide must be simultaneously aligned to the holder and the optical beam. A solution to this problem is illustrated in FIG. 14.

Figure 14:
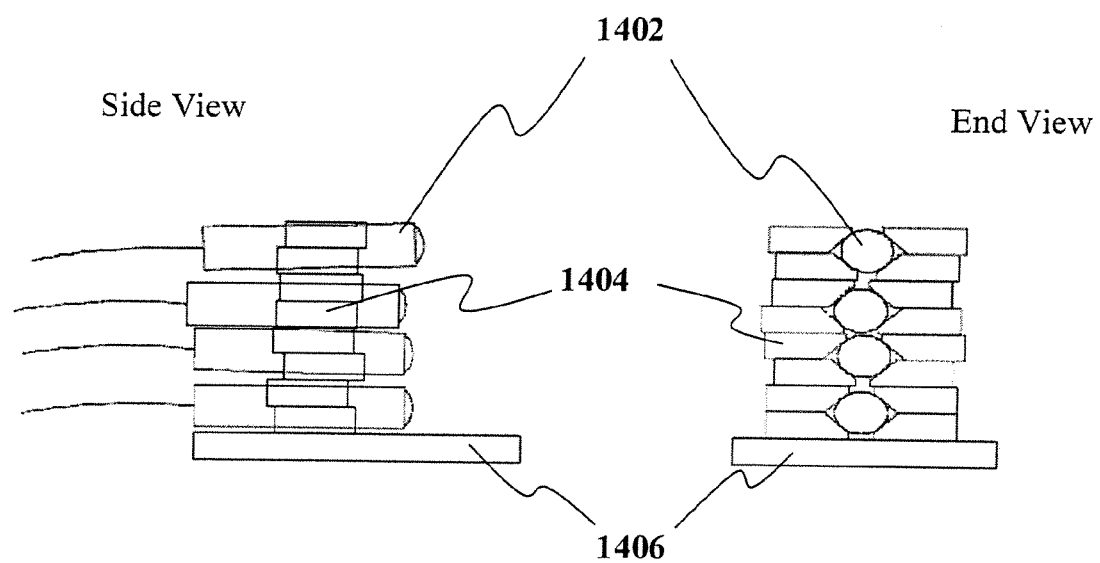
FIG. 14 is a schematic of a collimator holder array according to an embodiment of the invention.

FIG. 14 shows by way of illustration a 4 waveguide array where each waveguide 1402 is fixed in place by a set of structures 1404. Each structure has a common shape—a wedge in this example. For simplicity, each structure may also be of a common material, e.g., glass. In this approach, a waveguide 1402 is first aligned to the beam to optimize the optical coupling. The collimator holder is then assembled around the waveguide 1402 by placing the structures (e.g., wedges) 1404 in contact with the waveguide 1402, as illustrated in FIG. 14. An adhesive is placed on the wedges prior to assembly. The adhesive may be any adhesive curable with ultraviolet light. Epoxy may be used as the adhesive. The wedges provide large bond areas so minimal bond thickness may be employed.

According to FIG. 14, four wedges per waveguide 1402 are used, although any number of wedges could be used. The collimator stack is compact and flexible with a strong structural shape when completed. The structures can be stacked and provide for a constant nominal center-to-center collimator spacing if the structures are all of the same thickness. If variable collimator spacing is desired, structures of different thickness can be used for each waveguide. Any number of waveguides can be stacked in this manner. Using a spacer with an open slot, the first waveguide to be fixed does not have to be the bottom one in the stack.

This approach offers other key advantages over standard collimator holder arrays, and for that matter, standard single collimator holders. For example, the wedges allow conformance to the waveguide along the longitudinal axis of the waveguide. That is, each slanted surface of each wedge supports the waveguide along the longitudinal axis of the waveguide that it is in contact with. The waveguides can be adjusted to a wide range of angles and displacements and still all the wedges will tightly conform to the waveguides along long narrow contact lines (e.g., the interfaces between the longitudinal axes of the waveguides in contact with the slanted surfaces of the wedges). Additionally, since the wedges conform to the waveguide along a long narrow contact line, adhesive thickness between the waveguide and the holder is minimized. For example, if an adhesive with a relatively low viscosity is used, the adhesive will wick from an applied surface to the contact line with the waveguide. This allows the adhesive bond thicknesses in the structural path to be minimal, on the order of microns. This minimizes the amount of fixing material with a coefficient of thermal expansion (CTE) significantly different from the waveguide. The wedges can be made from a material with nearly the same CTE as the waveguide and the entire structural stack is made of close-packed pieces, mitigating strains in the assembly over temperature which can substantially degrade the optical coupling.

Also, because of the simple structure of the wedges, they can easily be fabricated from a variety of materials. In particular, making the wedges from glass allows ultraviolet curable epoxies to be used to fix the waveguides, and one waveguide at a time can be aligned and fixed, although all the waveguides could also be fixed at the same time. Thermally cured epoxies could also be used including epoxies cured at room temperature.

Figure 15:
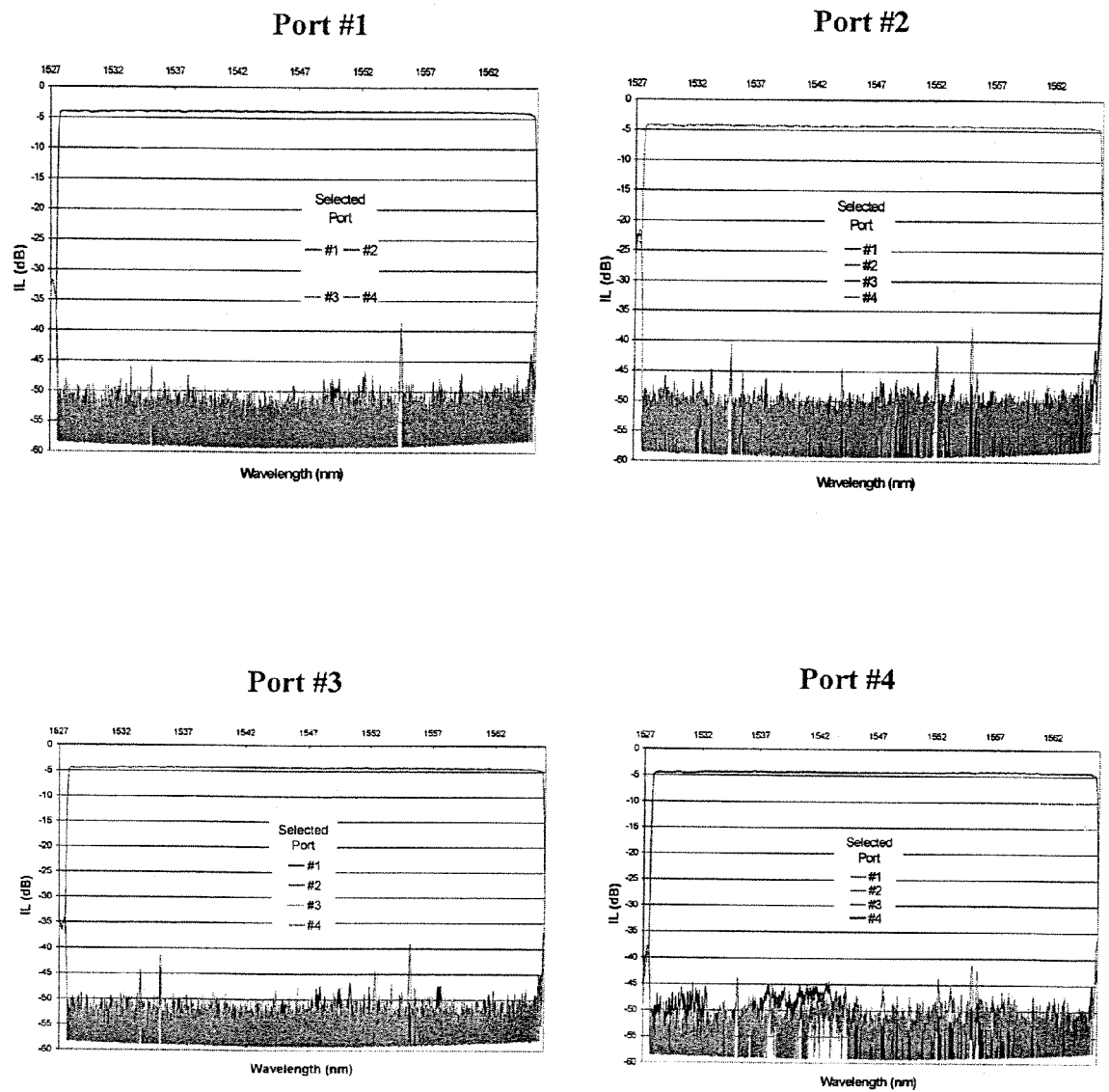
FIG. 15 is measured optical performance data for a 1×4 wavelength switch according to an embodiment of the current invention.

FIG. 15 shows the performance of an optical switch according to the third embodiment: a reflective 1×4 wavelength switch. This figure shows the output optical power versus wavelength measured at each port for all of the 4 possible switch settings. The wavelength range for operation of this device is from 1525 nm to 1570 nm. There is very little crosstalk between the ports; as is evident from the figure, the port isolation is typically >45 dB.

Those skilled in the art will recognize a number of benefits associated with the invention. For example, the invention provides an optical device employing liquid crystals as active polarization switches to route optical signals from an input optical fiber to one of a plurality of output fibers. The invention also provides a system employing liquid crystals as active polarization switches in conjunction with demultiplexing and multiplexing means to route each wavelength in a DWDM network from an input optical fiber to any one of a plurality of output fibers.

Another embodiment of the invention is a 1×5 wavelength selective switch that incorporates two reflective means in the LC assembly. This embodiment looks schematically identical to embodiment 3 (i.e., FIG. 10a). The differences occur in the LC cell assembly shown in FIG. 16a and the collimator/BD array shown in FIG. 16b.

Figure 16A:
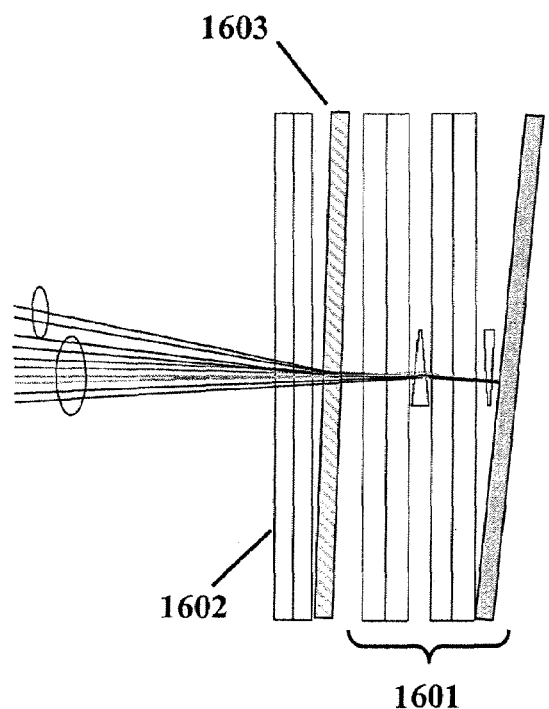
FIG. 16a shows a detail of the LC/wedge/transflective-polarizer switching assembly for an embodiment of a 1×5 wavelength selective switch that contains two reflecting elements for directing beams to different output ports.
Figure 16B:
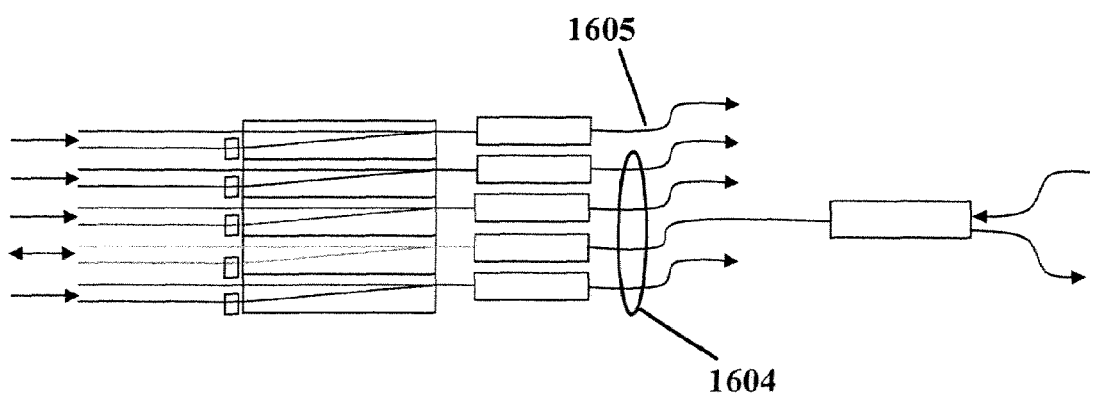
FIG. 16b is a schematic of the input/output port fiber coupling optics for an embodiment of a 1×5 wavelength selective switch that contains two reflecting elements for directing beams to different output ports.

With reference to FIG. 16a, the LC switch assembly has a 1×4 reflective assembly 1601 corresponding to the structure of FIG. 10b plus two additional components: a third LC array 1602 and a transflective polarization 1603, placed in front of the 1×4 assembly. The LC array 1602 is capable of switching the incident light between two orthogonal polarization states. The transflective polarizer is oriented to transmit one of these polarizations and reflect the other. Consider first the case where a pixel in array 1602 corresponding to a particular wavelength is switched so that the beam is transmitted through the transflective polarizer. This transmitted beam then passes through the 1×4 reflective assembly and according to embodiment 3 is directed to one of four output ports 1604 (shown in FIG. 16b), as selected by the two LC arrays in assembly 1601 (shown in FIG. 16a). In the opposite case where the beam is reflected by the transflective polarizer, it is directed to an additional port 1605 (shown in FIG. 16b). In this way, an input wavelength can be directed to any one of five output ports.

The advantage of this embodiment is singling out one port—the one addressed by reflection from the transflective polarizer. The light directed to this port is controlled only by the state of LC array 1602, whereas light transmitted to the remaining ports is controlled by the state of all of the LC arrays. There are some situations where this separate control is desirable or necessary. One situation is where one or more of the LC arrays is set to an intermediate state so that the light exiting the LC array is in some intermediate state of polarization, which is a combination of the two orthogonal states discussed previously. In that case, the beam corresponding to a given wavelength is directed to 2 or more of the output ports simultaneously. This is illustrated with two example applications.

The first example is signal power monitoring in a fiber optic network. Power monitors are necessary elements in current DWDM networks. For power balancing of wavelengths, power must be monitored separately for each wavelength. The current embodiment can serve this purpose if light at port 1605 is coupled to a photodetector. By directing a small known fraction (e.g., 1%) of only one wavelength at a time to this port, the optical power associated with each wavelength can be determined by scanning sequentially through all pixels in LC array 1602. There is a large savings in space and cost realized by integrating an optical power monitor in this way.

Figure 17:
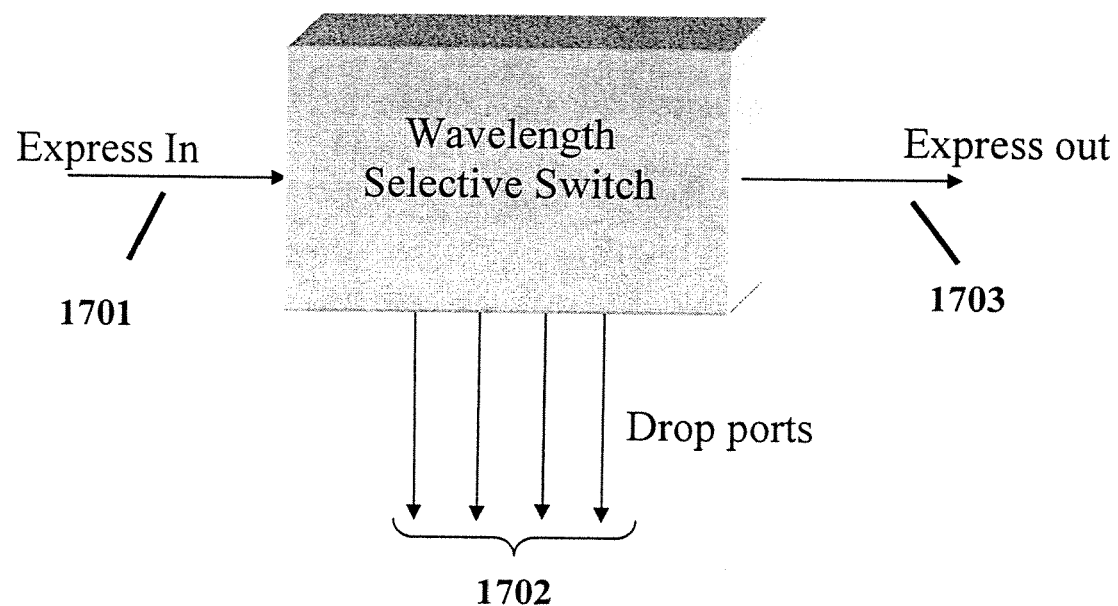
FIG. 17 is a schematic of a 1×5 wavelength selective switch operating as a 4 port reconfigurable drop module in a fiber optic network.

As a second example, consider using the wavelength selective switch of this embodiment for dropping wavelengths at a node in an optical network. This is illustrated in FIG. 17. A fiber carrying multiple wavelengths of network traffic—the express fiber 1701—enters the wavelength selective switch, where each wavelength is either dropped to 1 of 4 drop ports 1702 or passed to the express port 1703 and on to the next node in the network. As stated above, it is possible to realize this functionality with any of the embodiments 2-5 provided that no signal is split between 2 or more ports. However, if the network is designed for broadcasting (i.e., dropping a signal at more than one node), then the express signal must be split at one or more nodes. If the drop port is arbitrary, only this last embodiment can realize this functionality. Port 1605 is singled out as the express output port. With the pixel in LC array 1602 corresponding to the broadcast wavelength set to produce a mixed polarization state, part of the signal is reflected to the express output; the remaining portion is passed to the 1×4 assembly where it is directed to the desired drop port.

In addition to network broadcasting, this embodiment also supports node broadcasting (i.e., dropping a signal to all of the drop ports simultaneously) without effecting the express signal. This is done by setting both LC arrays in the 1×4 assembly 1601 to produce a mixed polarization state, sending portions of the signal to the 4 drop ports without altering the signal on the express output. Embodiments 2-4 would also broadcast to the express port as well as the drop ports, an undesirable constraint.

An LC array with the disclosed transflective polarizer may be incorporated into any of the embodiments 2-4 to achieve the same functionality.

Although the invention has been described in conjunction with particular embodiments, it will be appreciated that various modifications and alterations may be made by those skilled in the art without departing from the spirit and scope of the invention. Therefore, the invention should only be limited by the appended claims, wherein:

What is claimed is:

1. An optical switching apparatus, comprising:
an optical switch with an ingress polarization switch, a transflective polarizing element, and an assembly including at least M stages, where M is an integer with value of two or more, each stage including at least one polarization switch and a single birefringent wedge to direct an input optical beam to one of two output locations for further processing, the assembly thereby providing $2^M$ output locations;
wherein the ingress polarization switch is operative to produce a first linear polarization state and a second linear polarization state;
wherein the transflective polarizing element transmits the first linear polarization state to the M stages and reflects the second linear polarization state to a reflection port; and
wherein individual wavelength channels directed to the M stages are subject to wavelength selective switching to produce an output at one of the $2^M$ output locations.

2. The optical switching apparatus of claim 1 configured as a power monitor.

3. The optical switching apparatus of claim 1 configured to drop selective wavelengths.

4. The optical switching apparatus of claim 1 configured to support node broadcasting.

5. The optical switching apparatus of claim 1 further comprising:
at least one optical waveguide to deliver at least one input optical beam;

a dispersion device to spatially separate the at least one input optical beam into individual wavelength channels; and an optical power device to align the individual wavelength channels for delivery to the optical switch.

6. The optical switching apparatus of claim 5 further comprising:

a second optical power device to align the individual wavelength channels from the optical switch;

a second dispersion device to spatially combine individual wavelength channels from the second optical power device; and at least one output optical waveguide to receive at least one of the individual wavelength channels from the second dispersion device.

* * * * *